United States Patent [19]

Komine

[11] 4,129,363
[45] Dec. 12, 1978

[54] SOUND MOTION PICTURE CAMERA

[75] Inventor: Yoshio Komine, Yokohama, Japan

[73] Assignee: Canon Kabushiki Kaisha, Tokyo, Japan

[21] Appl. No.: 790,497

[22] Filed: Apr. 22, 1977

[30] Foreign Application Priority Data

Apr. 26, 1976 [JP] Japan .................................. 51-47514

[51] Int. Cl.² .............................................. G03B 31/02
[52] U.S. Cl. ......................................... 352/29; 352/27
[58] Field of Search ................................... 352/29, 27

[56] References Cited

U.S. PATENT DOCUMENTS

| | | | |
|---|---|---|---|
| 3,825,327 | 7/1974 | Kosarko et al. | 352/29 |
| 3,880,504 | 4/1975 | Marvin | 352/29 |
| 3,957,363 | 5/1976 | Hayashi et al. | 352/29 |
| 3,963,331 | 6/1976 | Komine et al. | 352/29 |
| 3,967,886 | 7/1976 | Komine et al. | 352/29 |
| 3,970,378 | 7/1976 | Takagi et al. | 352/29 |
| 3,986,770 | 10/1976 | Takagi et al. | 352/29 |
| 4,025,174 | 5/1977 | Takagi et al. | 352/29 |
| 4,037,948 | 7/1977 | Sakaguchi et al. | 352/29 |
| 4,052,125 | 10/1977 | Ishibashi | 352/29 |

Primary Examiner—Russell E. Adams
Attorney, Agent, or Firm—Toren, McGeady and Stanger

[57] ABSTRACT

The present invention relates to a sound motion picture camera capable of the sound recording on the film at the same time with the film exposure by using a sound film cartridge containing a sound film and having an opening for enabling sound recording on the film by means of sound recording device, whereby the sound motion picture camera is provided with a preventive means for preventing the film cartridge from being improperly taken out of the cartridge loading chamber of the camera in the state in which the sound recording device is operatively engaged with the film in the opening of the film cartridge for recording the sound on the film.

The preventive means is in functional engagement with the camera release means or the running lock means so as to prevent the film cartridge from being taken out of the cartridge loading chamber only when the depression of the release means or the locking of the release means in the depressed position by the lock means is freed and the release means resumes the freed position so as to disengage the sound recording device from the film.

28 Claims, 11 Drawing Figures

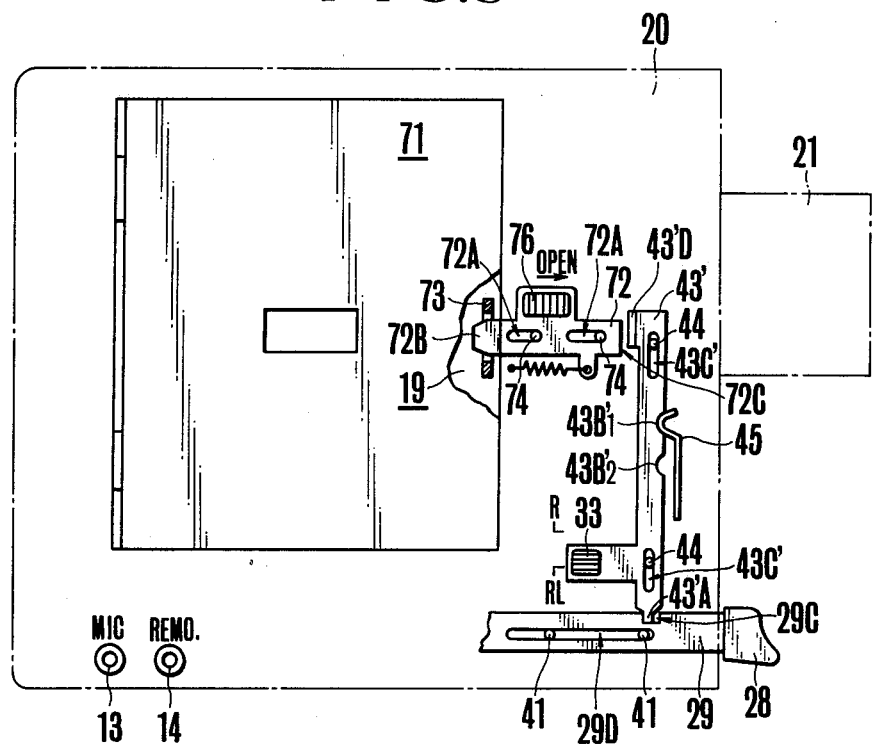
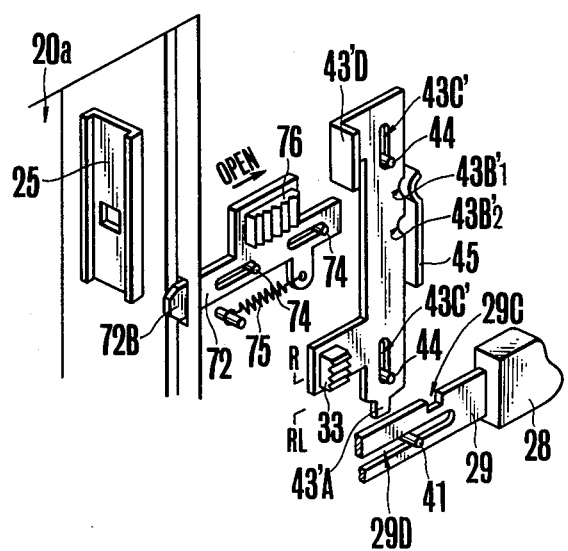

SOUND MOTION PICTURE CAMERA

BACKGROUND OF THE INVENTION

1. Field of the Invention

The present invention relates to a sound motion picture camera capable of recording the sound on the film at the same time with the film exposure by using a sound film cartridge containing a sound film capable of recording the sound information and the image information.

2. Description of the Prior Art

At present in the field of the motion picture camera, there are the most conventional silent motion picture camera capable of recording only the image information on the film and the sound motion picture camera capable of recording the image information and the sound information at the same time. The silent motion picture camera capable of recording only the image information on the film has been known since long, while the sound motion picture camera capable of recording the image information and the sound information on the film at the same time has appeared quite recently.

The reason why the conventional silent motion picture camera is capable of recording only the image information and incapable of recording the sound information lies in the film used. Namely the conventional film is not provided any means for recording the sound information on the film in a simple way. Thus it is sufficient that the silent motion picture camera in which the conventional silent film is used need be provided with only the efficiency for recording the image information on the film.

Quite recently the sound film cartridge containing the sound film provided with the means for recording the sound information on the film in a single way has appeared and therefore with the apperance with this kind of the sound film cartridge a sound motion picture camera provided with the efficiency for recording the sound information beside the conventional efficiency for recording the image information has been developed, as is disclosed in the German Pat. No. 1,217,782, the U.S. Pat. No. 3,858,968 and so on.

The largest difference between the silent motion picture camera capable of recording only the image information on the film and the sound motion picture camera capable of recording the image information and the sound information at the same time on the sound film capable of recording the image information and the sound information lies in the fact that the sound motion picture camera is provided with the sound recording device for recording sound signals on the film within an opening formed on a cartridge housing for enabling the sound recording on the film beside the picture taking device for film exposure in such a manner that at the time of picture taking under cooperation of the capstan with the pinch roller as the film continuously driving means in the sound recording device the sound film is fed at a constant speed between the magnetic head and the head pad as the magnetic recording means in the sound recording device, whereby the sound signals are recorded on the sound film by means of the sound recording means.

In case of the sound recording device of the sound motion picture camera in order to facilitate the insertion of the sound film between the magnetic head and the pad as well as the taking out of the sound film from between them they are so designed as to be changed over between the state in which they are largely apart from each other and the state in which they are in elastic contact respectively with both sides of the sound film under pressure so as to enable the recording of the sound signals on the sound film, while in order to facilitate the insertion of the sound film between the capstan and the pinch roller as well as the taking out of the sound film from between them they are so designed as to be changed over between the state in which they are largely apart from each other and in the state in which they are in elastic contact respectively with both sides of the sound film under pressure so as to feed the sound film between the magnetic head and the head pad almost at a constant speed.

As the method for controlling the changing over of the magnetic head and the head pad as well as the capstan and the pinch roller between the above mentioned states, as is disclosed in the German Pat. No. 1,217,782, the head pad and the pinch roller are functionally engaged with the opening and the closing operation of the openable cover of the cartridge loading chamber containing the film cartridge in such a manner that when the openable cover is opened the head pad and the pinch roller are largely apart from the magnetic head and the capstan, while when the openable cover is closed the head pad and the pinch roller are in elastic contact with the magnetic head and the capstan under pressure or as is disclosed in U.S. Pat. No. 3,880,504 the pinch roller is functionally engaged with the release means for controlling the starting and the stopping of the camera in such a manner that when the release means assumes the freed position the pinch roller is apart from the capstan while when the release member is depressed for camera release the pinch roller is in elastic contact with the capstan under pressure.

However in accordance with the method for controlling the changing over of the magnetic head, the head pad and the pinch roller, engaging them functionally with the opening and the closing operation of the openable cover of the cartridge loading chamber, when the openable cover of the cartridge loading chamber is closed, normally the head pad respectively the pinch roller are in elastic contact with the magnetic head respectively the capstan under pressure. If in this way, the pinch roller is in contact with the capstan under pressure even when the camera is in inoperative state, the pinch roller is subject to the plastic deformation at the position at which the roller is in contact with the capstan under pressure, because generally the pinch roller consists of elastic materials such as rubber so as to obtain a large frictional coefficient, whereby when the pinch roller is deformed, the film feeding of the film is disturbed so that the wow and the flutter of the sound signals are remarkable. Further, there is a danger that the photo-sensitive emulsion and so on coated on the film plane between the magnetic head and the head pad as well as between the capstan and the pinch roller in elastic engagement with each other under pressure should be deteriorated when the film cartridge remain loaded in the cartridge loading chamber of the camera without taking picture.

From the above mentioned view point, it is most desirable that the capstan and the pinch roller as well as the magnetic head and the head pad should be so designed that the capstan respectively the magnetic head are apart from the pinch roller respectively the head pad when no picture is taken while they are in contact with each other only when picture starts to be taken, namely in functional engagement with the release member for controlling the starting and the stopping of the camera the head pad respectively the pinch roller are largely apart from the magnetic head respectively the capstan when the release member is in the freed position, while the head pad respectively the pinch roller are brought into the elastic contact with the magnetic head respectively the capstan under pressure when the release means is depressed.

On the other hand, the motion picture camera is often placed apart from the photographer so as to be remote controlled, not being held by the photographer. This measures is taken when it is desired that the photographer himself should be the object or when the photographer could not approach the object in case of ecological picture of natural animals, whereby the motion picture camera is connected to a cable so as to be electrically operated or the motion picture camera is provided with a receiver in such a manner that the electrical wave or the light beam is sent from the sender at the hand of the photographer to the receiver of the camera so as to operate the motion picture camera.

However, in case of the conventional motion picture camera, there is no member whose position is largely different at the time of picture taking and non-picture taking such as the pinch roller for the capstan and the head pad for the magnetic head peculiar to the sound motion picture camera and therefore, it is sufficient to control the starting and the stopping of the motor for driving the intermittent film feeding mechanism for intermittently feeding the film at the film exposure opening, while in case of the sound motion picture, it is necessary to provide a special means for bringing the capstan respectively the magnetic head in elastic contact with the pinch roller respectively the pad before the operation of the camera because it is necessary that the pinch roller respectively the head pad should be in elastic contact with the capstan respectively the magnetic head during the operation of the camera.

The sound motion picture camera capable of remote control is so designed that, as has already been explained, in functional engagement with the opening and the closing operation of the openable cover of the cartridge loading chamber the capstan respectively the pinch roller are in elastic contact with the magnetic head and the pad when the openable cover is closed, whereby this kind of the camera has such inconveniences as mentioned above.

Hereby it can also be thought out that the engagement of the capstan with the pinch roller respectively of the magnetic head with the head pad as well as the disengagement of the capstan from the pinch roller respectively of the magnetic head from the head pad could easily be remote controlled by means of magnet, in case of the sound motion picture camera so designed that the engagement of the capstan with the pinch roller respectively of the magnetic head with the head pad as well as the disengagement of the capstan from the pinch roller respectively of the magnetic head from the head pad are carried out in functional engagement with the release means, whereby a remarkably large strength is needed in comparison with the normal shutter release in order to carry out the engagement and the disengagement so that a large magnet is used for producing such a large strength in such a manner that the current consumed in the magnet becomes also large and the power source of large capacity has to be prepared. After all, the camera can not be made compact and there takes place a problem of the portability.

Then it can be thought out that in case of the sound motion picture so designed that the engagement and the disengagement are carried out in functional engagement of the release means that after the remote control device has been mounted on the camera body, bringing the release switch to be controlled by means of the release means the release member is operated in such a manner that the pinch roller respectively the head pad is in elastic contact with the capstan respectively the magnetic head, which state remains locked by means of the resuming lock means, while the operation of the camera is controlled by means of the starting switch provided on the remote control device. In case of the above method, the capstan respectively the magnetic head remains in contact with the pinch roller respectively the head pad only when the remote control is set operable so that when the remote control is not set inoperable the capstan respectively the magnetic head are apart from the pinch roller respectively the head pad even if the camera is left in inoperative state and therefore the inferior influence upon the pinch roller as well as the film can be checked minimum, which is very profitable.

Hereby the problem of the camera designed as sound motion picture capable of the remote control so designed that after the release means has been operated so that the capstan and the magnetic head are brought into elastic contact with the pinch roller and the head pad, the release member is locked by means of the running lock means and then the camera is operable by means of the starting switch of the remote control device is that the film cartridge loaded in the cartridge loading chamber can be errorneously taken out of the cartridge loading chamber while the camera is set remote controlable. Namely in case the camera is set remote controlable, the film between the magnetic head and the head pad as well as the capstan and the pinch roller are strongly clamped by them so that when the film cartridge is tried to be taken out in the above state, the film can not be taken out from between the magnetic head and the head pad as well as the capstan and the pinch roller, whereby there exit dangers that the film wound in the film cartridge is pulled out of the cartridge to be damaged or that the magnetic head or the head pad is deformed or damaged and so on.

SUMMARY OF THE INVENTION

The above mentioned situations being taken into consideration, a purpose of the present invention is to offer a means for effectively preventing such misoperation that the film cartridge be improperly taken out of the cartridge loading chamber by the mistake of the photographer when the camera release means is kept in the depressed position and therefore the pinch roller and head pad press the film against the capstan and the mangetic head, in case of a sound motion picture camera of cartridge system designed in such a manner that in functional engagement with the camera release operation the pinch roller and the head pad press the sound film against the capstan and the magentic head in an elastic way.

The above mentioned purpose is accomplished in accordance with the present invention by providing in the sound motion picture camera composed as above a preventive means for preventing the film cartridge from being improperly taken out of the cartridge loading chamber so far as the release means is kept in the depressed position in functional engagement with the camera release means or the running lock means adapted for locking the release means at the depressed position.

In accordance with a preferred embodiment of the present invention the above preventive means is constituted so as to advance into the path along with the film cartridge is taken out, for example, between the film cartridge loaded in the cartridge chamber and the operable cover for the chamber in order to directly prevent the film cartridge from being taken out of the cartridge loading chamber, when the release means is depressed, in functional engagement with the camera release means.

Further in case of the present embodiment, the preventive means is in a concrete way provided on a part of a supporting frame member rotatably supporting the pinch roller and movable so as to operatively engage the pinch roller with the capstan in response to the operation of the release means.

Further in accordance with another embodiment, the preventive is concretely constituted so as to advance into the course along which the film cartridge is taken out, for example between the film cartridge loaded in the cartridge chamber and the openable cover for the chamber, when the camera release means is locked in the depressed position by means of the running lock means in functional engagement with the running lock means.

Further in accordance with further another embodiment, the preventive means is constitute so as to directly prevent the film cartridge from being taken out of the cartridge loading chamber by making the opening of the operable cover for the cartridge loading chamber. When the camera release means is locked in the depressed position by means of the running lock means, in functional engagement with the running lock means.

Hereby in case of the present embodiment, the preventive means is constituted in a concrete way so as to work upon the cover locking member for locking the openable cover at the closed state in order to make the release of the cover locking member when the camera release means is locked in the depressed position by means of the camera release means.

Further other purposes and features of the present invention will be disclosed out of the explanations to be made below in accordance with the drawings of various embodiments of the present invention.

BRIEF DESCRIPTION OF THE DRAWINGS

Below several preferred embodiments of the present invention will be explained in accordance with the accompanying drawings.

FIG. 2 shows the state in which no film cartridge is loaded in the cartridge loading chamber of the camera and no remote control is possible while FIG. 3 shows the state in which a film cartridge is loaded in the film cartridge loading chamber of the camera and the remote control is possible.

FIG. 6(a) shows the state in which no release means is depressed so that the pinch roller is apart from the capstan while the preventive means for avoiding the improper taking out of the cartridge does not prevent the taking out of the film cartridge while FIG. 6(b) shows the state in which the release means is depressed so that the pinch roller is in engagement with the capstan under pressure while the preventive means for avoiding the improper taking out of the cartridge prevents the taking out of the film cartridge.

FIGS. 8–10 show particularly a preventive means for avoiding the improper taking out of the film cartridge constituted otherwise than the two above mentioned means of further another embodiment of the sound motion picture camera in accordance with the present invention, in elevation and in perspective view, whereby FIGS. 8 and 10 show the state in which the cartridge chamber cover is not closed and the preventive means for avoiding the improper taking out of the film cartridge does not operate, while FIG. 9 shows the state in which the cartridge chamber cover is closed and the preventive means for avoiding the improper taking out of the film cartridge operates.

DETAILED DESCRIPTION OF THE PREFERRED EMBODIMENT

Figure 1:
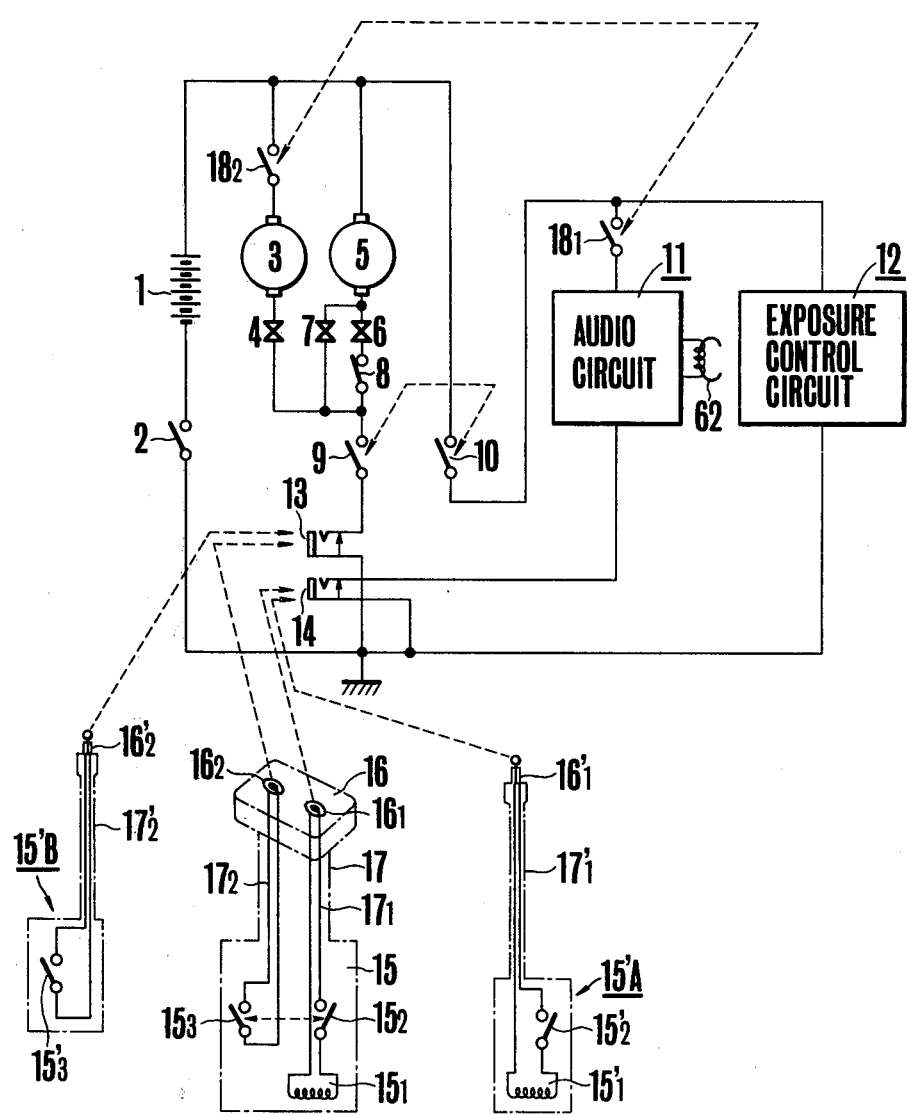
FIG. 1 shows an embodiment of the electrical circuit applicable to the sound motion picture camera in accordance with the present invention.

FIG. 1 shows an embodiment of the electrical circuit applicable to the sound motion picture camera in accordance with the present invention, whereby 1 is the power source, 2 the main switch, 3 the motor for driving the capstan (to be explained later) as continuous film feeding means; 4 the speed control means such as governer for controlling the rotation of the motor, 5 the motor for driving the film feeding claw (not shown in the drawing) as intermittent film feeding means, 6 and 7 the speed control elements such as governers for controlling the rotation of the motor 5 whereby 6 is for high speed while 7 is for the low speed and 8 the switch to be controlled by means of the loop sensor (to be explained later).

When the switch 8 is closed, the motor 5 rotates faster than when the switch 8 is opened, because the speed control element 6 for high speed is connected. 9 and 10 are the switches constituting a two step switch means to be controlled by means of the release means (to be explained later) of the camera, whereby 9 and 10 are in such an engagement with each other that by means of operating the release means the switch 10 is closed at first and then a little later the switch 9 is closed. 11 is the sound recording circuit, whose output is connected to the sound recording head 62 (to be explained later). 12 is the exposure control circuit.

Figure 3:
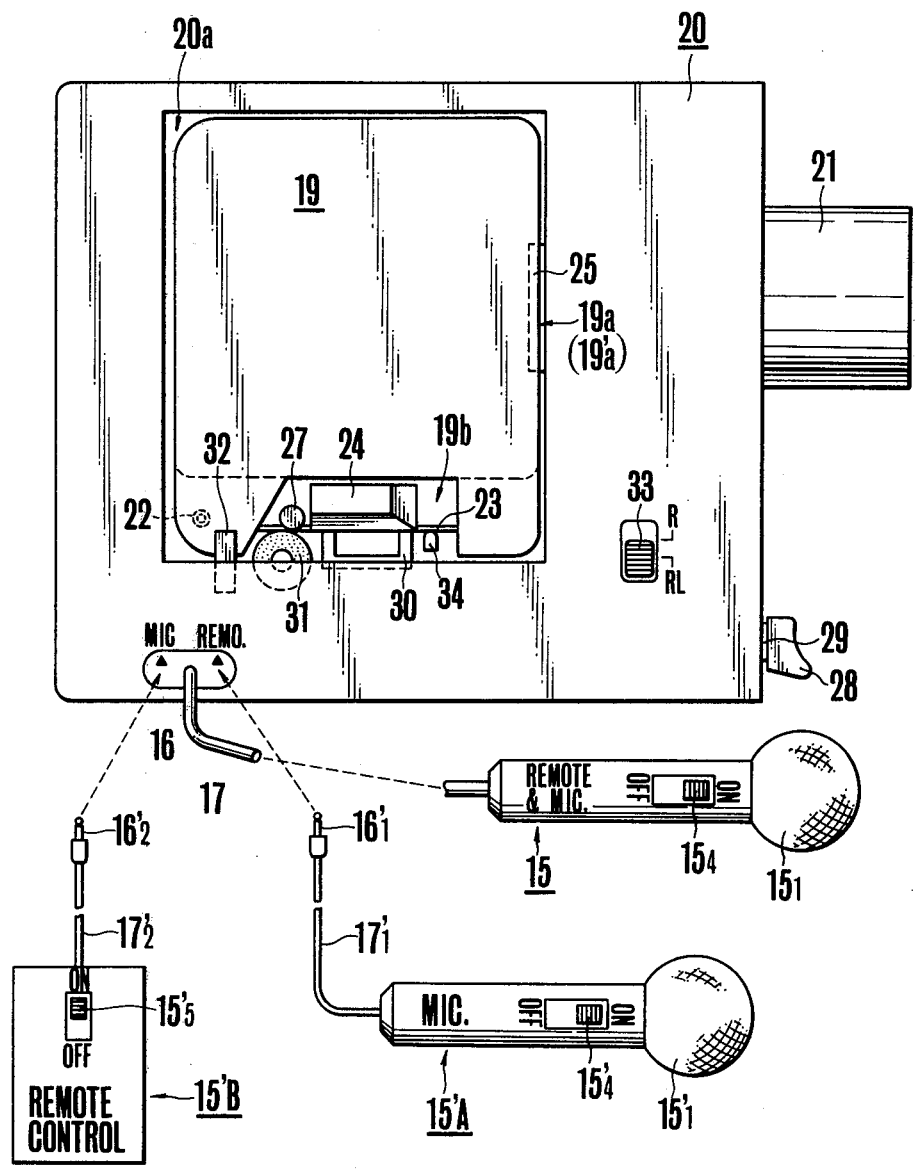

13 is the jack for connecting the remote controller, 14 the jack for connecting the microphone unit, being connected to the sound recording circuit 11. 15 is the microphone unit presenting the microphone $15_1$, the microphone switch $15_2$ and the remote switch $15_3$ functionally engaged with the microphone switch $15_2$, whereby the switches $15_2$ and $15_3$ can be operated by means of the operation nob $15_4$ (shown in FIG. 3).

16 is the coupler presenting the first plug $16_1$ to be inserted into the jack 14 and the second plug $16_2$ to be inserted into the jack 13, whereby the microphone $15_1$ and the remote switch $15_3$ are respectively connected to the first plug $16_1$ and the second plug $16_2$ of the coupler 16 through the lead wires $17_1$ and $17_2$ of the cable 17.

Hereby 15'A and 15'B are the microphone unit and the remote control unit constituted separately, whereby the microphone unit 15'A is provided with the microphone $15'_1$ connected through the cable $17'_1$ to the plug $16'_1$ to be inserted into the jack 14 and the microphone switch $15'_2$ which can be operated by means of the nob $15'_4$ (shown in FIG. 3). Further the remote control unit 15'B is provided with the remote switch $15'_3$ connected through the cable $17'_2$ to the plug $16'_2$ to be inserted into the jack 13, whereby the switch $15'_3$ can be operated by means of the nob $15'_5$ (shown in FIG. 3).

$18_1$ and $18_2$ are the cartridge type detecting switches to be closed when the sound film cartridge in which the sound film capable of recording the image information and the sound information is loaded in the cartridge loading chamber of the camera and to be opened when the silent film cartridge capable of recording only the image information is loaded or when no film cartridge is loaded.

In the electrical circuit composed as mentioned above, the switches $18_1$ and $18_2$ are in the opened state as is shown in FIG. 1, while when the release switches 9 and 10 are closed after the main switch 2 has been closed while none of the microphone unit 15, the microphone unit 15'A and the remote unit 15'B is connected to the jacks 13 and 14, the current flows through the motor 5 and the exposure control circuit 12 from the power source 1 but does not flow through the motor 3 and the recording circuit 11. When the switches $18_1$ and $18_2$ are in the closed state by loading the sound film cartridge containing the sound film capable of recording the image information and the sound information, the current flows through the motors 3 and 5, the sound recording circuit 11 and the exposure control circuit 12 from the power source 7.

When the release switches 9 and 10 are closed while the microphone unit 15 or the microphone units 15'A and 15'B are connected to the jacks 13 and 14, the switches $15_2$ and $15_3$ or the switches $15'_2$ and $15'_3$ provided on the microphone unit 15 or the microphone units 15'A and 15'B are closed and the main switch 2 as well as the switches $18_1$ and $18_2$ are closed, a current is supplied to the motors 3 and 5, the sound recording circuit 11 and the exposure control circuit 12 from the power source 1 in such a manner that the camera is brought into the state capable of recording the sound information and the image information at the same time, while when the switches $15_2$ and $15_3$ or the switches $15'_2$ and $15'_3$ are opened the current supply to the motors 3 and 5, the exposure control circuit 12 and the audio circuit 11 is interrupted, whereby the synchronized sound recording photography is stopped.

Below the first embodiment of the sound motion picture camera in accordance with the present invention will be explained in accordance with FIGS. 2 to 6. Hereby the electrical circuit shown in FIG. 1 can be applied without modification as that for the sound motion picture camera shown in FIGS. 2 to 6, so that the explanation will be made also in accordance with FIG. 1.

Figure 2:
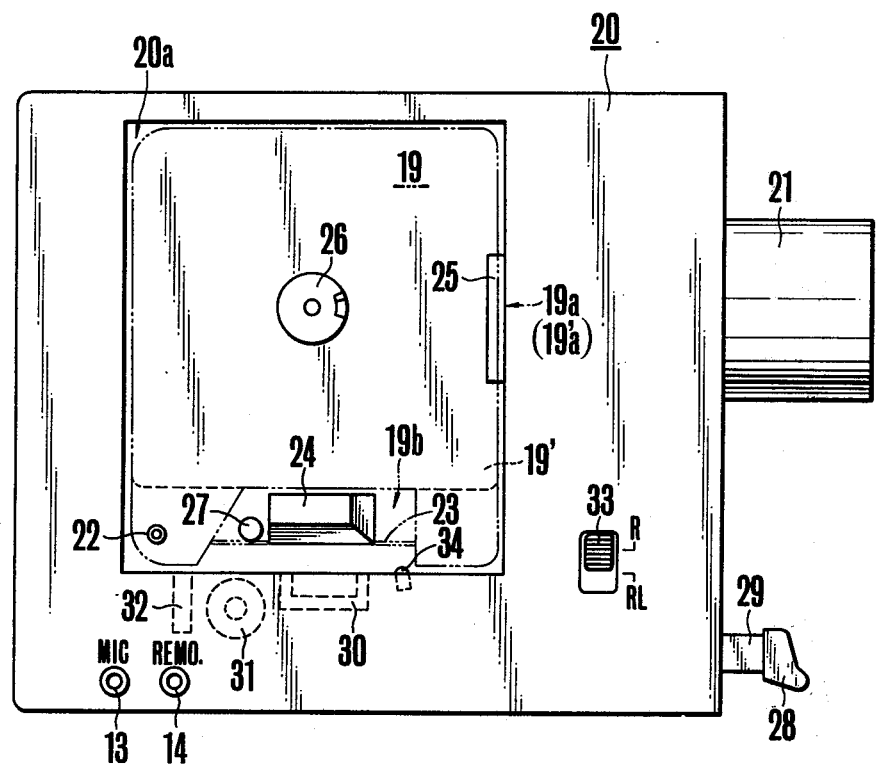
FIG. 2 and FIG. 3 respectively shows a side view of the first embodiment of the sound motion picture camera in accordance with the present invention without the cartridge chamber cover, whereby

In FIGS. 2 and 3, the film cartridge 19 is for example, the one of the type generally called "EKTASOUND CARTRIDGE" (trade name) sold by the U.S. EASTMAN KODAK, hereby presenting the film exposure opening 19a and the sound recording opening 19b. 20 is the camera body, while 21 is the photographic lens mounted on the camera body 20. 20a is the film cartridge loading chamber provided in the camera body 20, presenting an opening at the one side of the camera body 20 through which opening the film cartridge 19 can be loaded and unloaded. It goes without saying that the camera body 20 is provided with an openable cover for selectively covering the opening of the cartridge loading chamber 20a, whereby the cover is omitted in the drawings.

22 is the cartridge type detecting member for controlling the switches $18_1$ and $18_2$ showing in FIG. 1, being provided at the position of a part of the cartridge loading chamber 20a at which the member 22 is in contact with the film cartridge 19 only when the sound film cartridge 19 containing the sound film capable of recording the image information and the sound information is loaded in the cartridge loading chamber 20a in such a manner that the member 22 projects into the cartridge loading chamber 20a so as to open the switches $18_1$ and $18_2$ when no sound film cartridge 19 is loaded in the cartridge loading chamber 20a or a silent film cartridge 19' is loaded as is shown in a broken line while the member 22 is withdrawn out of the cartridge loading chamber 20a by means of the pressure of the film cartridge 19, so as to close the switches $18_1$ and $18_2$ when the sound film cartridge 19 is loaded into the cartridge loading chamber 20a.

24 is the protection cover for protecting the magnetic head 62 (shown in FIG. 4) electrically connected to the sound recording circuit 11, presenting the efficiency for protecting the magnetic head 62 from the protection cover 24, for preventing the damage of the magnetic head being in contact with a part of the sound film cartridge 19 when the sound film cartridge 19 is loaded into the cartridge loading chamber 20a and for acting as the wall for positioning the silent film cartridge 19' when the conventional film cartridge 19' containing a silent film capable of recording only the image information is loaded.

Namely, beside the sound film cartridge 19 containing a sound film capable of recording the image information and the sound information the conventional silent film cartridge 19' containing the silent film capable of recording only the image information can be used in the sound motion picture camera in accordance with the present information, whereby the conventional silent film cartridge 19' is positioned above the protection cover 24 as is shown in the drawing.

25 is the film gate member in which the exposure aperture is formed, being arranged at the position corresponding to the film exposure opening 19a or 19'a of the film cartridge 19 or 19' when the film cartridge 19 or 19' is loaded into the cartridge loading chamber 20a. In the neighborhood of the film gate member 25, the film feeding claw (not shown in the drawing) is provided so as to intermittently feeding the film loaded in the film cartridge 19 or 19' at the film exposure opening 19a or 19'a, whereby the conventional mechanism can be used as mechanism for intermittently feeding the film by means of the film feeding claw. Hereby the intermittent film feeding mechanism for driving the film feeding claw is driven with the driving power of the motor 5.

26 is the winding up shaft engaged with the film winding up spool (not shown in the drawing) of the film cartridge 19 or 19' loaded in the cartridge loading chamber 20a so as to rotate the film winding up spool, being driven with the driving power of the motor for driving the intermittent film feeding mechanism.

27 is the capstan driven with the motor 3 shown in FIG. 1. 28 is the release operation button for operating the release member 29 for controlling the release switches 9 and 10 shown in FIG. 1. 30 is the film guide member functionally engaged with the release member 29 so as to be movable between the position at which the guide member 30 guides the running of the sound film 23 as is shown in FIG. 3 and the position at which the member 30 withdraws the film 23 out of the running course as is shown in FIG. 2.

31 is the pinch roller arranged at the position diametrical to the capstan 27 with reference to the running course of the sound film 23, being functionally engaged with the release member 29 so as to be in elastic engagement with the capstan 23 under pressure through the sound film 23 as is shown in FIG. 3 and movable, between the magnetic head 62 and the pad 61 (shown in FIG. 4), between the position at which the film is fed at a constant speed and the position at which the roller 31 is withdrawn out of the running course of the sound film, largely apart from the capstan as is shown in FIG. 2.

32 is the element for selectively preventing the sound film cartridge 19 loaded in the cartridge loading chamber 20a from being taken out of the cartridge loading chamber 20a, being functionally engaged with the release member 29 so as to enter into the opening of the cartridge loading chamber 20a and to prevent the film cartridge 19 from being taken out of the cartridge loading chamber 20a when the release button 28 is depressed and the camera is in operative state (FIG. 3) and so as to withdrawn out of the opening of the cartridge loading chamber 20a and to allow the film cartridge 19 to be taken out of the cartridge loading chamber 20a when the release button 28 is freed and the camera is in inoperative state (FIG. 2).

33 is the running lock button adapted for locking the release button 28 at the depressed position, being movable between the position of the index "R" (run) provided on the camera body 20 and the position of the index "RL" (running lock) in such a manner that when the lock button 33 is at the position of "R", the release button 28 can be operated in a normal way when the lock button 33 is moved into the position of "RL" after the release button 28 has been depressed, the release button 28 and the release member 29 are kept at the depressed position, namely the so called running lock is possible. Further the remote control is also possible. The remote control is to be explained later.

34 is the loop sensor for detecting at the position shown in FIG. 3, in the sound recording opening 19b of the cartridge the alteration of the amount of the film loop formed between the exposure opening 19a and the sound recording opening 19b of the film cartridge 19 in order to obtain the satisfactory synchronization of the image with the sound, whereby the switch 8 is provided on the capstan 34. When the speed at which the film 23 is fed at the sound recording opening 19b by means of the continuous film feeding mechanism including the capstan 27 and the pinch roller 31 is higher than that at which the film 23 is fed at the exposure opening 19a by means of the intermittent film feeding mechanism including the film feeding claw member in such a manner that the amount of the film loop between the intermittent film feeding mechanism and the continuous film feeding mechanism, the film 23 becomes loose and the loop sensor 34 moves downwards in FIG. 3, whereby the switch 8 shown in FIG. 1 is opened. Thus, only the low speed adjusting element 7 is connected and the rotation speed of the motor 5 is lowered in such a manner that the amount of the film loop is reduced. When contrary to the above, the continuous film feeding speed is higher than the film feeding speed of the intermittent film feeding mechanism, the amount of the film loop is reduced and the loop sensor 34 moves upwards. When the amount of the film loop is larger than a certain determined amount, the switch 8 is closed, whereby the higher speed adjusting element 6 is connected and the rotation speed of the motor 5 is increased in such a manner that the amount of the film loop is increased. In this way, the synchronization of the film feeding speed of the intermittent film feeding mechanism with that of the continuous film feeding mechanism, namely the synchronization of the image with the sound is established.

Hereby the jack 13 for the microphone and the jack 14 for the remote control correspond to the jacks in the electrical circuit shown in FIG. 1, while the microphone unit 15 as well as the microphone unit 15'A and the remote control unit 15'B correspond to the elements with the same figures shown in FIG. 1.

Figure 4:
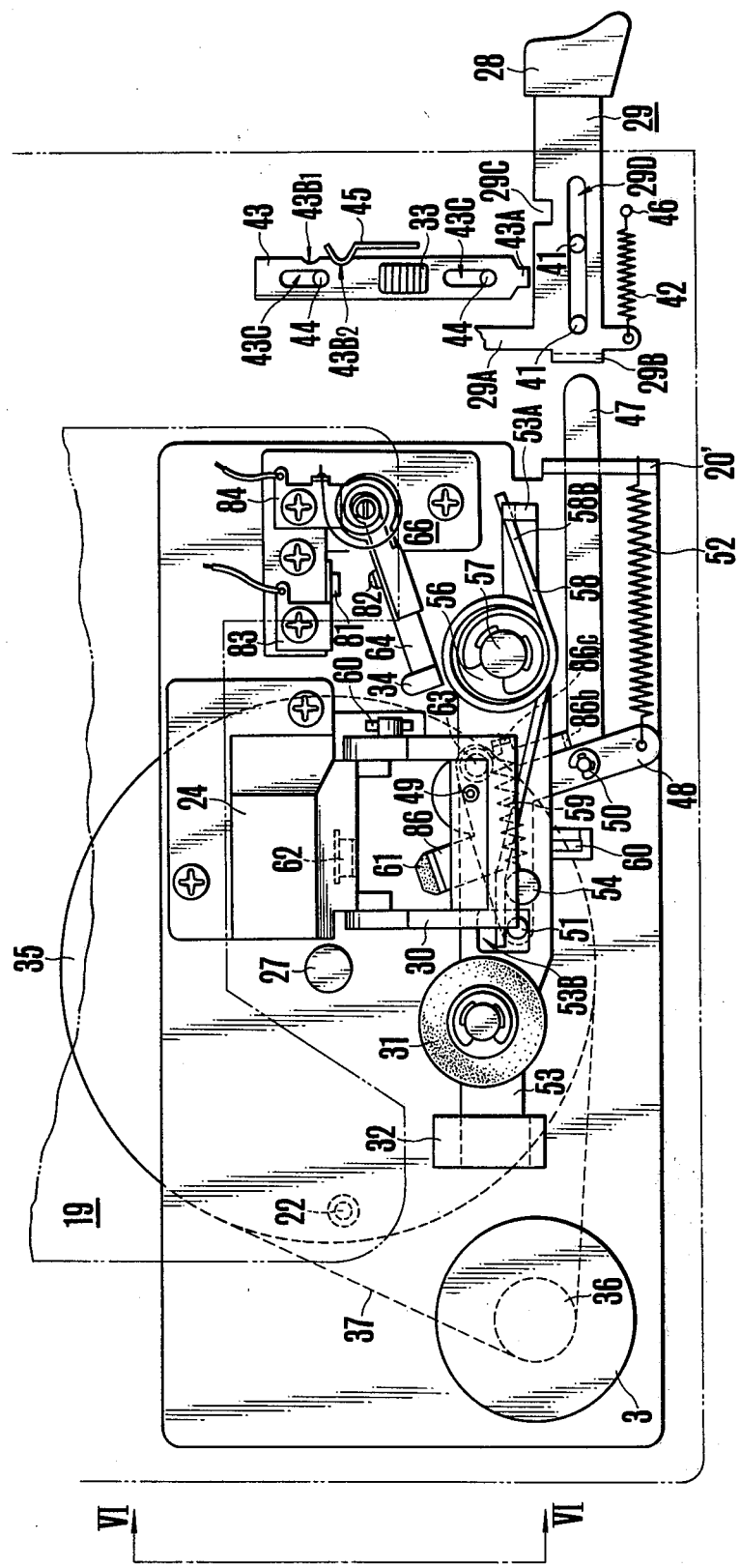
FIG. 4 shows particularly the arrangement and the constitution of the continuous film feeding means, the sound recording means, the preventive means for avoiding the improper taking out of the cartridge, the loop sensor means, the running lock means, the release means and so on of the sound motion picture camera shown in FIG. 2 and FIG. 3, in detail in plane view.
Figure 5:
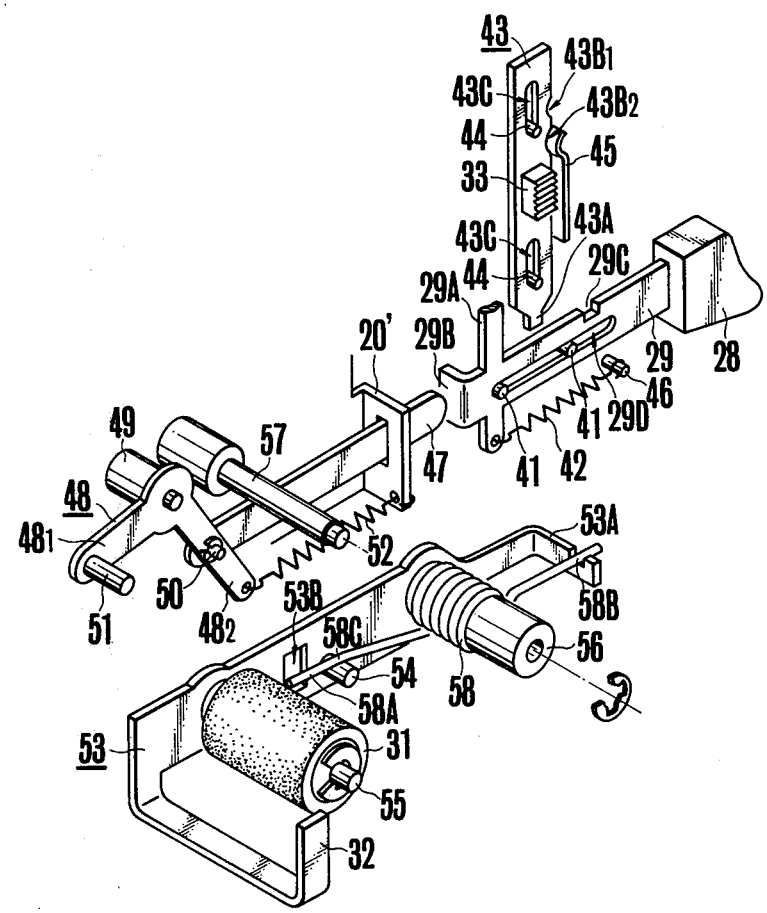
FIG. 5 shows the engagement relation between the continuous film feeding means, the release means, the running lock means and the preventive means for avoiding the improper taking out of the cartridge shown in FIG. 4, in broken up perspective view.
Figure 6:
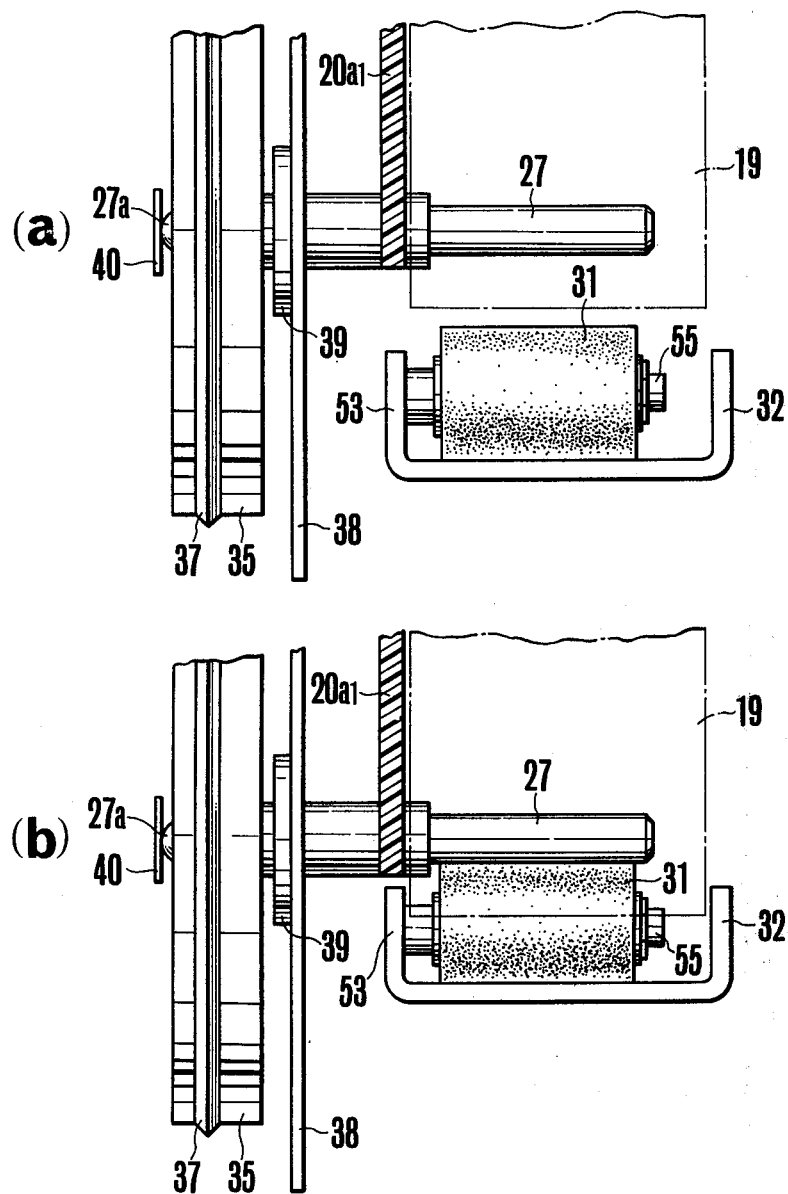
FIG. 6 shows particularly the relation between the pinch roller and the preventive means for avoiding the improper taking out of the cartridge shown in FIG. 4, in enlarged view (along the line VI — VI in FIG. 4), whereby

The detailed mechanism of the release member 29 for translating the pinch roller 31, the element for preventing the cartridge from being taken out, the film guide member 30 and so on is shown in FIGS. 4 to 6.

In FIGS. 4 to 6, the members with the same figures as those in FIGS. 2 and 3 correspond to the respective members. In the drawing, 35 is the fly-wheel for keeping the rotation of the capstan 27 at a constant speed. 37 is the power transmission belt provided between the pulley 36 secured on the rotary shaft of the motor 3 and the fly-wheel 35, whereby the rotation power of the motor 3 is transmitted to the fly-wheel 35 through the belt 37, so as to rotate the capstan provided on the fly-wheel 35. As is shown in detail in FIG. 6, a part of the capstan 27 penetrates the bottom wall $20a_1$ of the cartridge loading chamber 20a so as to project into the cartridge loading chamber 20a. 38 is the capstan support plate for pivoting the capstan 27, 38 the collar member for limiting the translation of the capstan 27 toward the inside of the cartridge loading chamber 20a, being secured on the capstan 27. 40 is the spring member in contact with the pivot part 27a formed at the one end of the capstan 27, normally urging the collar member 39 toward the inside of the cartridge loading chamber 20a so as to bring the collar member 39 in contact with the support plate 38 in order prevent the axial vibration of the capstan 27. Hereby the wow and the flutter can effectively be avoided.

The release member 29 is provided with the release switches 9 and 10 shown in FIG. 1, the control part 29A for controlling the driving and the stopping of the intermittent film feeding mechanism, the bent part 29B, the notch 29C and the long hole 29D. 41 is the pin engaged into the long hole 29D of the release member 29 so as to guide the slide movement of the release member 29, being secured on the camera body 20. 42 is the tension spring whose one end is fixed on the release member 29 and whose other end is fixed on the pin 46 secured on the camera body 20, normally urging the release member 29 to the right in FIG. 4, namely toward the freed position of the release button 28 and the release member 29.

43 is the running lock member to be operated by means of the running lock button 33 shown in FIG. 3, being provided with the lock part 43A, the click groove 43B$_1$, 43B$_2$ and the long hole 43C. 44 is the pin engaged into the long hole 43C of the running lock member 43 so as to guide the slide movement of the running lock member 43, being secured on the camera body 20. 45 is the click spring secured on the camera body 20, selectively acting upon the click groove 43B$_1$ or 43B$_2$ of the running lock member 43 so as to keep the lock member 43 at the locking position and the unlocking position. Such members as the running lock button 33, the running lock member 43 and the click spring 45 constitute the running lock mechanism, whereby when the running lock mechanism depresses the release button 28 from outside so as to translate the release member 29 to the left in FIG. 4 against the strength of the spring 42 until the notch 29C assumes the position opposed to the lock part 43A of the lock member 43 and then the running lock button 33 is moved from "R" into "RL" in FIGS. 2 and 3, the lock member 43 is pushed downwards, the lock part 43A of the lock member 43 is engaged into the notch 29C of the release member 29 in such a manner that the release button 28 and the release member 29 are kept at the depressed position even when the depressed release button 28 is freed. Namely, by means of the lock member 43 it is possible to keep the camera in operative state (Running Lock).

The functional engagement of the pinch roller 31 with the release member 29 is shown in detail in FIG. 5. 47 is the slide member slidably supported by means of the support plate 20' secured on the camera body 20, whereby the one end of the slide member 47 is arranged at the position at which the end can be brought in contact with the bent part 29B of the release member 29. 48 is the crank member rotatably pivoted on the shaft 49 fixed on the camera body 20, being provided with the arms 48$_1$ and 48$_2$, whereby the arm 48$_2$ is linked with the slide member 47 by means of the pin 50 while the arm 48$_1$ is provided with the pin 51. 52 is the spring whose one end is engaged with the arm 48$_2$ of the crank member 48, whose other end is engaged with the supporting plate 20' fixed on the camera body and which urges the crank member 48 normally along the counterclockwise direction around the shaft 49, whereby no pressure is given to the release member 29 because of the urging strength of the spring 52 so that when the release member 29 has been moved to the right in the drawing (freed position), the slide member 47 has been moved to the right. Further the crank member 48 and the slide member 47 are so constituted that when a pressure is given to the release member 29 from outside so as to move the release member to the left in the drawing, the slide member 47 is moved to the left in the drawing by means of the bent part 28B of the release member 29 in such a manner that the crank member 48 is rotated along the clockwise direction against the strength of the spring 52 around the shaft 49. 53 is the movable pinch roller supporting member rotatably supporting the pinch roller 31, which member can be changed over in functional engagement of the movement of the release member 29 between the position at which the pinch roller 31 is brought in elastic contact with the capstan 27 as is shown in FIG. 3 and the position at which the pinch roller 31 is largely apart from the capstan 27 as is shown in FIG. 2. This supporting member 53 is provided with the preventive member for preventing the film cartridge 19 from being improperly taken out of the cartridge loading chamber 20a, the notches 53A, 53B, the pins 54 and 55, whereby the pinch roller 31 is rotatably pivoted on the pin 55. Further, the pin 51 provided on the crank member 48 is inserted into the notch 53B. 56 is the hole metal secured on the supporting member 53, being pivoted on the shaft 57 secured on the camera body 20, so as to be rotated together with the supporting member 53 around the shaft 57. 58 is the spring wound up on the metal 56, whose one end 58B is engaged in the notch at the bent end 53A of the supporting member 53 and whose other end 58C is engaged with the pin 54, whereby the pin 51 of the crank member 48 inserted through the notch 53B of the supporting member 53 can be brought into contact with the free end 58A situated outside of the pin from the beneath.

In this way, when the crank member 48 is rotated along the clockwise direction against the force of the spring around the shaft 49 in the drawing, the supporting member 53 is rotated along the shaft 57 by means of the other end 58B of the spring in the drawing in such a manner that the pinch roller 31 is brought into contact with the capstan 27. Hereby the spring 58 acts simply as the accompanying member of the supporting member 53 while the pinch roller 31 is moved out of the position shown in FIG. 6(a) into the one shown in FIG. 6(b), namely the position at which the pinch roller 31 is in contact with the capstan 27, while after the pinch roller 31 has been brought into the contact with the capstan 27 so that the further rotation of the supporting member 53 is prevented by means of the capstan 27, the free end 58A of the spring 58 is further pushed up through the pin 51 by means of the further rotation of the crank member 48 until the end 58C of the spring 58 is brought apart from the pin 54, whereby the spring 58 is further charged so as to urge the supporting member 48 along the clockwise direction. Thus, the urging force of the spring 58 at this time, is made use of as the force for bringing the pinch roller 31 in elastic contact with the capstan 27.

In FIG. 4, 86 is the pad supporting member rotatably pivoted on the shaft 63 secured on the camera body 20, being provided with the head pad 61 which can be brought into contact with the sound recording magnetic head 62. The pad supporting member 86 is provided with the bent part 86b engageable with the arm 48$_2$ of the crank member 48 and the bent part 86c which is engaged with the other end of the tension spring 59 whose one end is engaged with the camera body 20, being normally urged along the clockwise direction by means of the strength of the spring 59 in such a manner that the bent part 86b is brought in contact with the arm 48$_2$ of the crank member 48.

Consequently, when the crank member 48 is rotated along the clockwise direction and the pinch roller 31 is broght into the capstan 27, the pad supporting member 86 is rotated along the clockwise direction around the shaft 63 in functional engagement with the rotation of the crank member 46 so as to bring the head pad 61 in elastic contact with the magnetic head 62 under pressure.

60 is the engaging member for translating the film guide member 30 in functional engagement with the pinch roller supporting member 48, being so designed as to bring the film guide member 30 into the position at which the film running course is determined in functional engagement with the movement of the supporting member 48 when the pinch roller 31 is brought into contact with the capstan 27 by means of the supporting member 53 and to withdraw the film guide member 30 out of the film running course in functional engagement with the movement of the supporting member 48 when the pinch roller 31 is brought largely apart from the capstan 27 by means of the supporting member 48.

66 is the insulated loop senser base plate secured on the camera body 20, 64 the insulated loop senser arm whose one end bears the loop senser 34 and whose other end is rotatably pivoted on the shaft (not shown in the drawing) secured on the loop senser base plate, 81 is the electrical contact fixed on the conductive piece 83 secured on the loop senser base plate 66 and 82 the electrical contact secured on the loop senser arm 64, whereby the electrical contacts 81 and 82 constitute the switch 8 shown in FIG. 1. 65 is the spiral spring for normally urging the loop senser arm 64 along the clockwise direction, whose one end is engaged with the conductive piece 84 secured on the loop senser base plate 66 and whose other end is engaged with the conductive pin 67 adjustably and rotatably mounted at the end of the loop senser arm 64 in such a manner that the pin 67 is kept electrically connectecd to the contact 82. The above loop senser arm 64 is also functionally engaged with the pinch roller supporting member 48, so designed as to be withdrawn out of the film running course in functional engagement with the movement with the supporting member 48 when the pinch roller 31 is brought largely apart from the capstan 27 by means of the supporting member 48.

In case of the sound motion picture camera constituted as shown in FIGS. 1 to 6 in accordance with the present invention, when the running lock button 33 assumes the position "R" so that the click spring 45 is engaged into the clock groove $43_2$ of the lock member 43 while the release button 28 is not depressed, every mechanism is in non-operative state as is shown in FIG. 4. Namely, the capstan 27 respectively the magnetic head 62 are largely apart from the pinch roller 31 respectively the head pad 61 while the preventive means 32, the loop senser 34 and the film guide member 30 are largely withdrawn from the film running course so as to facilitate the loading of the sound film cartridge 19 into the cartridge loading chamber 20a as well as the taking out of the cartridge 19 from the loading chamber 20a (FIG. 2).

When then the film cartridge 19 containing the sound film 23 capable of recording the image information and the sound information is loaded into the cartridge loading chamber 20a in order to carry out the synchronized sound recording photography, the cartridge type detecting member 22 operates so as to close the switches $18_1$ and $18_2$.

When then the microphone unit 15'A is connected to the jack 14, the switch nob $15'_4$ is changed over into "ON", and the release button 28 is depressed so as to slide the release member 29 to the left in the drawing while the main switch 2 is kept closed, at first the release switch 10 connected with the exposure control circuit 12 and the audio circuit 11 is closed by means of the slide motion of the release member 29, then the pinch roller 31 and the head pad 61 press the film 23 against the capstan 27 and the magnetic head 62 in an elastic way while the preventive means 32 projects into the opening of the cartridge loading chamber 20a and then the release switch 9 is closed after the film guide member 30 and loop sensers 34 have advanced into the film running course. (namely this state is shown in FIG. 3, which shows the running lock state so that the change over nob 33 assumes the position "R" when no running lock is done). In consequence in this state the image information is recorded on the film 23 in the film cartridge 19 at the exposure opening 19a while at the same time the sound information corresponding to the image information is recorded on the film 23 by means of the magnetic head 62 when the film 23 is fed at a constant speed between the magnetic head 62 and the head pad 61 by means of the capstan 27 and the pinch roller 31. Namely, the image information and the sound information are recorded on the different parts on the film at the same time.

At the time of stopping the camera, the release member 29 is translated to the right by releasing the depressing the shutter release button 29, whereby every member moves as is shown in FIG. 2.

Below the running lock or the remote control will be explained.

In order to carry out the running lock for keeping the running state, at first the release button 28 is depressed by a finger so as to bring the camera into operative state, and then the running lock button 33 is translated downwards into the position "RL", whereby the lock part 43A is engaged into the notch 29c of the release member 29 assuming the position corresponding to the lock part 43A of the lock member 43 in such a manner that the release member 29 is locked at the position at which the camera is in operative state (FIG. 3), namely in the running lock state. In this running lock state, it is possible to remote control the camera by means of the remote switch $15_3$ provided on the microphone unit 15 or the switch $15'_3$ provided on the remote control unit 15'B.

Although in this state the camera is brought into the non-operative state, the switches $15_3$ or $15'_3$ having been opened, the pinch roller 31, the pad 61, the film guide member 30 and the loop senser 34 remain in the operative state so as to bind the film as is shown in FIG. 3, whereby the preventive piece 32 also projects into the film cartridge loading chamber 20a so as to prevent the film cartridge 19 from being taken out of the cartridge loading chamber 20a.

Thus, although the photographer tries to take out the film cartridge from the cartridge loading chamber 20, opening the openable cover of the chamber 20, forgetting the fact that the camera is in the running lock state, only having opened the remote switches $15_3$ or $15'_3$, the film cartridge can not be taken out, hindered by means of the preventive means 32 in such a manner that even if the photographer tries to take out the sound film cartridge 19 by mistake while the camera is in the running lock state, such misoperation can effectively be avoided.

Figure 7:
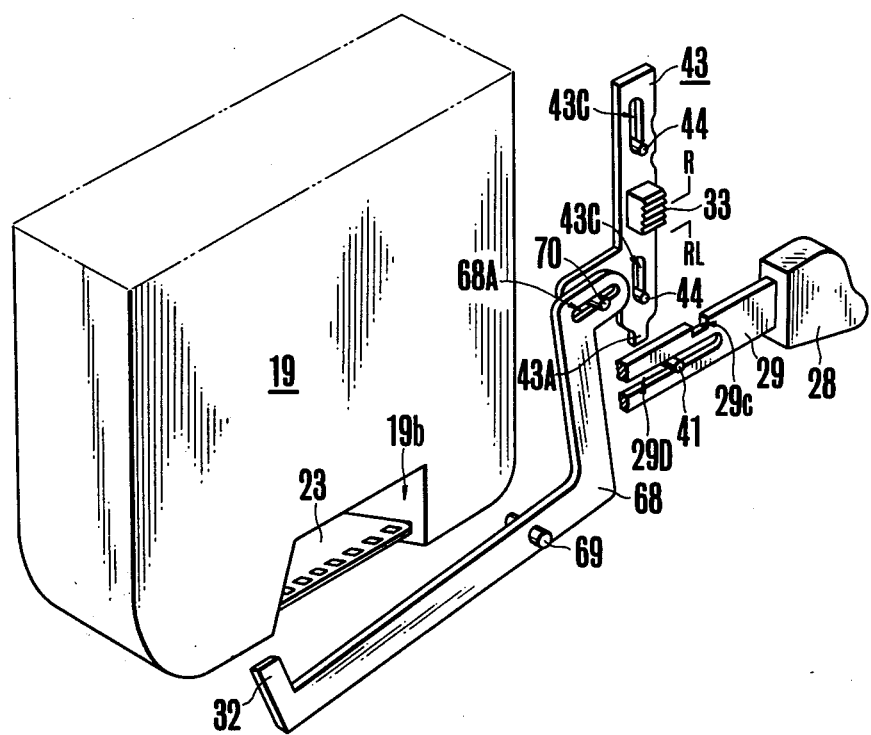
FIG. 7 shows particularly a preventive means for avoiding the improper taking out of the film cartridge constituted otherwise than the above mentioned means of another embodiment of the sound motion picture camera in accordance with the present invention, in perspective view.

FIG. 7 shows another embodiment in accordance with the present invention so constituted that the above preventive means 32 for preventing the film cartridge from being improperly taken out of the cartridge loading chamber is functionally engaged with the running lock member 43 so as to prevent the sound film cartridge 19 from being improperly taken out of the cartridge loading chamber while the camera is set in the running lock state.

Namely in the drawing, 68 is the crank lever the end of whose one arm 68A is formed as the preventive means 32 and which is rotatably pivoted on a part of the camera body 20 by means of the fixed shaft 69, whereby on the other arm 68B of the crank lever 69 a long hole 68C is formed, in which long hole 68C the pin 70 mounted on a part of the running lock member 43 is engaged.

In case of thus constituted sound motion picture camera, although when the running lock button 33 assumes the position "R", the preventive means 32 is retired out of the cartridge loading chamber 20a, when the running lock button 33 is changed over into the position "RL", the crank lever 68 is rotated along the clockwise direction in functional engagement with the downward slide motion of the running lock member 43 so that the preventive means 32 projects into the film cartridge loading chamber 20a so as to prevent the sound film cartridge 19 from being taken out of the cartridge loading chamber.

Figure 8:
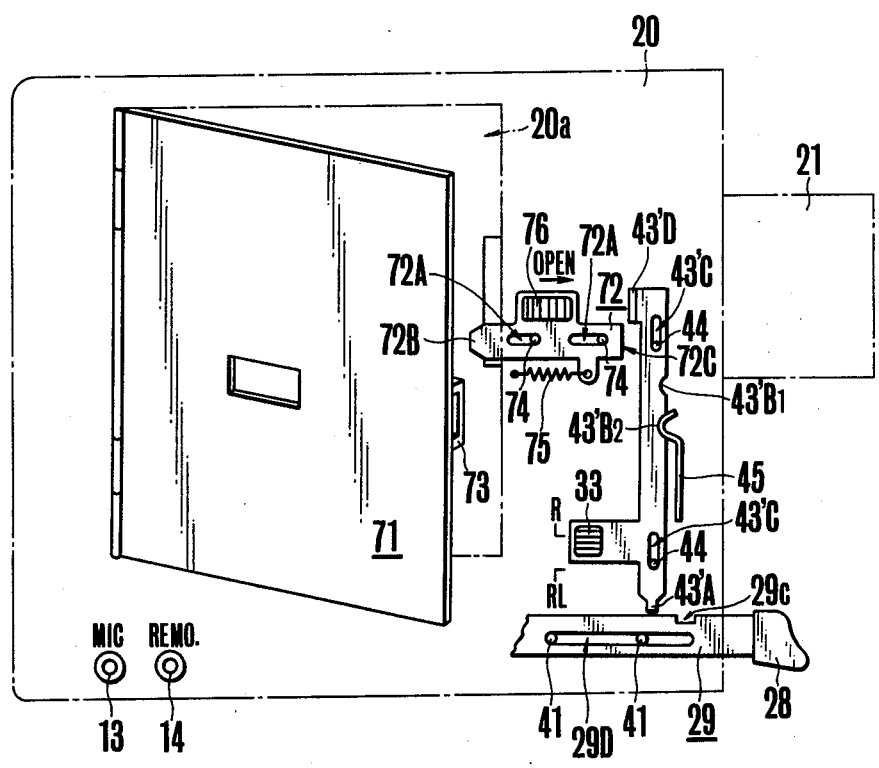

FIG. 8 to FIG. 10 show further another embodiment of the sound motion picture camera in accordance with the present invention, whereby the members with the same figures as those in FIGS. 1 to 7 are the members of the same construction and the same efficiency.

In the present embodiment, when the running lock button 33 is at the position "RL" and the release member 29 is locked at the depressed position by means of the running lock member 43', the openable cover 71 of the film cartridge loading chamber 20a is locked in the closed state so as to prevent the lock member 72 of the openable cover from being released out of the locked state and to prohibit the opening of the openable cover 71.

Namely, in FIGS. 8 to 10, the lock member 72 of the openable cover presents the engaging piece 72B engageable with the hook member 73 provided on the back surface of the openable cover 71 so as to lock the openable cover 71 in the closed position and at the same time, can be moved sliding to the left in the drawing being guided by means of the pin 74 secured on the camera body and engaged in the long hole 72A, whereby the engagement of the engaging piece 72B with the hook member 73 provided on the openable cover 71 is released, when the lock member 72 of the openable cover 71 is moved sliding along the direction of the arrow "OPEN" in the drawing against the strength of the spring 75 by means of the operation nob 76, so as to allow the opening of the openable cover.

On the other hand, the running lock member 43' is provided with the preventive means 43'D for preventing the lock release operation of the lock member 72 of the openable member 71 by means of the operation nob 76 while the running lock member 43' assumes the position at which the member 43' is in contact with the tail end 72C of the lock member 72 of the openable cover only when the openable cover 71 is closed, the lock member 73 of the openable cover is set at the running lock position by means of the running lock button 33 while the openable cover 71 is locked in the closed position.

In case of the camera constituted in this way, when the running lock button 33 assumes the position "R" shown in FIGS. 8 and 10, the lock member 72 of the openable cover can move sliding freely, while when the running lock button 33 assumes the position "RL" shown in FIG. 9, the preventive member 43'D of the running lock member 43' assumes the position at which the member 43'D can be in contact with the tail end 72C of the lock member 72 of the openable cover so as to prevent the translation of the lock member 72 of the openable cover by means of the nob 76 along the direction of the arrow "OPEN" in the drawing. Namely, when the camera is set in the running lock state the openable cover 71 can not be opened, and therefore the film cartridge 19 loaded in the cartridge loading chamber 20a can not be taken out of the cartridge loading chamber 20a.

As explained above, the present invention relates to a cartridge type sound motion picture camera so constituted that in functional engagement with the operation of the camera release means the capstan and the magnetic head press the sound film against the pinch roller and the head pad in an elastic way, whereby the camera is provided with the preventive means for preventing the film cartridge from being improperly taken out of the cartridge loading chamber in functional engagement with the camera release means or the running lock means adapted for locking the release means at the depressed position in such a manner that the erroneous operation of the photographer for taking the film cartridge out of the cartridge loading chamber when the camera release means is kept in the depressed position so that the capstan and the magnetic head press the film against the pinch roller and the head pad can effectively be avoided. Thus, the present invention is quite profitable for this kind of the cartridge sound motion picture camera provided with the running lock mechanism.

What is claimed is:

1. A motion picture camera capable of simultaneous sound recording on a sound film in a sound film cartridge containing a sound film, comprising:
    (A) a cartridge loading chamber for loading a sound film cartridge;
    (B) a manually operable camera release means,
    (C) a sound recording means for recording sound signals on the sound film, said recording means being operatively associated with the camera release means and changeable in response to the operation of the release means between a first state in which the recording means is disengaged from the sound film for enabling the retracting of the sound film cartridge from the cartridge loading chamber and a second state in which the recording means is operatively engaged with the sound film for sound recording,
    (C') a manually operable locking means couplable to said release means for locking said camera release means at a position at which said sound recording means is set into said second state, and
    (D) a preventive means for preventing the retracting of the sound film cartridge from the cartridge loading chamber when the sound recording means is set in the second state, said preventive means being arranged in operative association with the camera release means so as to enable the retracting of the film cartridge when the operation of the release means is released and the sound recording means moves into the first state.

2. A sound motion picture camera according to claim 1, wherein the sound recording means includes;
a driving shaft member provided within the cartridge loading chamber at a fixed position for continuously advancing the sound film, and
a pressure roller member for operatively engaging the sound film with the driving shaft member for continuous advance, said roller member being rotatably supported by a supporting member which is operatively associated with the camera release means and movable in response to the operation of the release means between a 1st position in which the roller member disengages the film from the driving shaft member for enabling the retracting of the cartridge from the chamber and a 2nd position in which the roller member engages the film with the driving shaft member for continuous advance,
whereby the preventive member for preventing the retracting of the film cartridge is functionally associated with the supporting member so as to prohibit the retracting the sound film cartridge from the cartridge loading chamber.

3. A sound motion picture camera according to claim 2, wherein the preventive means for preventing the retracting of the film cartridge is provided on a part of the supporting member.

4. A sound motion picture camera according to claim 1, wherein the preventive means for preventing the retracting of the cartridge is constituted as the preventive member for preventing the retracting of the sound film cartridge, projecting into the cartridge loading chamber in functional engagement with the camera release means when the sound recording means is set in the 2nd state.

5. A sound motion picture camera according to claim 4, wherein the sound recording means includes;
a driving shaft member provided within the cartridge loading chamber at a fixed position for continuously advancing the sound film, and
a pressure roller member for operatively engaging the sound film with the driving shaft member for continuous advance, said roller member being rotatably supported by a supporting member which is operatively associated with the camera release means and movable in response to the operation of the release means between a 1st position in which the roller member disengages the film from the driving shaft member for enabling the retracting of the cartridge from the chamber and a 2nd position in which the roller member engages the film with the driving shaft member for continuous advance,
whereby the preventive member is functionally associated with the supporting member, advancing into the cartridge loading chamber so as to prohibit the retracting the sound film cartridge from the cartridge loading chamber when the supporting member moves into the 2nd position in response to the operation of the camera release means.

6. A sound motion picture camera according to claim 5, wherein the preventive member is provided on a part of the supporting member.

7. A sound motion picture camera capable of simultaneous sound recording with a sound film cartridge containing a sound film, comprising;

(A) a cartridge loading chamber for receiving the sound film cartridge,
(B) a manually operable camera release means,
(C) a sound recording means for recording sound signals on the sound film, said recording means including;
(C-1) a recording head member provided within the cartridge loading chamber at a fixed position for sound recording.
(C-2) a pressure pad member for operatively engaging the film with the head member for sound recording, said pad member being operatively associated with the camera release means and shiftable in response to the operation of the release means between a first position in which the pad member disengages the film from the head member and a second position in which the pad member operatively engages the film with the head member for sound recording,
(C-3) a driving shaft member provided within the cartridge loading chamber at a fixed position for continuously advancing the film, and
(C-4) a pressure roller member for operatively engaging the film with the driving shaft member for continuously advancing, said roller member being operatively associated with the camera release means and shiftable in response to the operation of the release means between a first position in which the roller member disengages the film from the driving shaft member and a second position in which the roller member operatively engages the film with the driving shaft member for continuous advance,
(C') a manually operable locking means adapted for locking said camera release means at a position at which said pressure pad member and said pressure roller member are set into their respective second positions, and
(D) a preventive means for preventing the retracting of the sound film cartridge from the cartridge loading chamber when the pressure pad members and the pressure roller members are respectively set in the second position, said preventive means being operatively associated with the camera release means so as to enable the retracting of the film cartridge when the pad member and the roller member are respectively shifted into the first position and the operation of the release means is freed.

8. A sound motion picture camera according to claim 7, further comprising:
shifting means for shifting the pressure pad member and pressure roller member between the 1st and 2nd position each respectively, said shifting means being operatively connected with the both members and operatively associated with the camera release means for shifting the both members in response to the operation of the release means,
whereby the preventive means for preventing the retracting of the film cartridge is operatively associated with the shifting means so as to prohibit the retracting of the sound film cartridge from the cartridge loading chamber when the both members are respectively shifted in the 2nd position by means of the shifting means in response to the operation of the camera release means.

9. A sound motion picture camera according to claim 8, wherein the shifting means includes;

a supporting member for rotatably supporting the pressure roller member, said supporting member being operatively associated with the camera release means and movable in response to the operation of the release means so as to shift the roller member between the 1st and the 2nd position, whereby the preventive means for preventing the retracting of the film cartridge is arranged on a part of the supporting member.

10. A sound motion picture camera according to claim 7, wherein the preventive means for preventing the retracting of the film cartridge is constituted as preventive member for preventing the retracting the sound film cartridge, advancing into the cartridge loading chamber in functional engagement with the camera release means when the pressure pad member and the pressure roller member are respectively set in the 2nd position.

11. A sound motion picture camera according to claim 10, further comprising;

shifting means for shifting the pressure pad member and the pressure roller member between the 1st and the 2nd position each respectively, said shifting means being operatively connected with the both members and operatively associated with the camera release means for shifting the both members in response to the operation of the release means;

whereby the preventive member is operatively associated with the shifting means so as to advance into the cartridge loading chamber in order to prevent the retracting of the sound film cartridge from the cartridge loading chamber when the both members are respectively shifted into the 2nd position by means of the shifting means in response to the operation of the camera release means.

12. A sound motion picture camera according to claim 11, wherein the shifting means includes;

a supporting means for rotatably supporting the pressure roller member, said supporting member being operatively associated with the camera release means and movable in response to the operation of the release means so as to shift the roller member between the 1st and the 2nd position;

whereby the preventive member is provided on a part of the supporting member.

13. A sound motion picture camera capable of simultaneous sound recording with use of a sound film cartridge containing a sound film, comprising;

(A) a cartridge loading chamber for loading the sound cartridge, (A') a manually operable camera release (B) a sound recording means for recording the sound signals on the sound film, said recording means being operatively associated with said camera release and changeable in response to a camera release operation of the camera release means between a first state in which the recording means is disengaged from the sound film for enabling the retracting of the sound film cartridge from the cartridge loading chamber and a second state in which the recording means is operatively engaged with the sound film for sound recording, (C) a manually operable locking means for locking the sound recording means at the second state, said locking means being changeable between an unlocking position and a locking position by manual operation from outside of the camera, and (D) a preventive means for preventing the retracting the sound film cartridge from the cartridge loading chamber when the sound recording means is locked in the second state by means of the locking means, said preventive means being functionally engaged with the locking means so as to enable the retracting of the sound film cartridge when the locking means is shifted into its unlocking position.

14. A sound motion picture camera according to claim 13, wherein the preventive means for preventing the retracting of the cartridge is constituted as preventive member functionally engaged with the locking means so as to advance into the cartridge loading chamber in order to prevent the retracting of the sound film cartridge when the sound recording means is locked in the 2nd state by means of the locking means.

15. A sound motion picture camera according to claim 13, further comprising;

a cover means for closing the cartridge loading chamber; whereby the preventive means for preventing the retracting of the cartridge is constituted as preventive member being functionally engaged with the locking means so as to prohibit the opening of the cover means in order to prevent the retracting of the sound film cartridge when the sound recording means is locked in the second state by means of the locking means.

16. A sound motion picture camera according to claim 15, further comprising;

a manually operable cover locking member for locking the cover means at a closed position, whereby the preventive member can act upon the cover locking member so as to prohibit the releasing of the cover locking member in order to prevent the retracting of the sound film cartridge when the sound recording means is locked in the 2nd state by means of the locking means.

17. A sound motion picture camera capable of simultaneous sound recording with use of a sound film cartridge containing a sound film, comprising;

(A) a cartridge loading chamber for loading the sound film cartridge, (B) a camera release means movable between a freed position and an operated position for camera releasing by manual operation from outside of the camera, (C) a sound recording means for recording sound signals on the sound film, said recording means being operatively associated with the camera release means and changeable in response to the operation of the release means between a 1st state in which the recording means is disengaged from the sound film for enabling the retracting of the sound film cartridge from the cartridge loading chamber and a 2nd state in which the recording means is operatively engaged with the sound film for sound recording, (D) a manually operable locking means for locking the camera release means at the operated position, said locking means being changeable between an unlocking position and a locking position by manual operation from outside of the camera and (E) a preventive means for preventing the retracting of the sound film cartridge from the cartridge loading chamber when the camera release means is locked in the operated position by means of the locking means, said preventive means being operatively associated with the locking means so as to enable the retracting of the cartridge when the locking means is shifted into its unlocking position.

18. A sound motion picture camera according to claim 17, wherein the preventive means for preventing the retracting of the cartridge is constituted as preventive member for preventing the retracting of the sound film cartridge, advancing into the cartridge locking chamber in functional engagement with the locking means when the camera release means is locked in the operated position by means of the locking means.

19. A sound motion picture camera according to claim 17, further comprising;
a cover means for closing the cartridge loading chamber;
whereby the preventive means for preventing the retracting of the cartridge is constituted as preventive member for preventing the retracting of the sound film cartridge, prohibiting the opening of the cover means in functional engagement with the locking means when the camera release means is locked in the operated position by means of the locking means.

20. A sound motion picture camera according to claim 19, further comprising;
a manually operable cover locking member for locking the cover means at a closed position;
whereby the preventive member can act upon the cover locking member so as to prohibit the releasing of the cover locking member in order to prevent the retracting of the sound film cartridge when the camera release means is locked in the operated position by means of the locking means.

21. A sound motion picture camera capable of simultaneous sound recording with use of a sound film cartridge containing a sound film, comprising;
(A) a cartridge loading chamber for loading the sound film cartridge,
(A') a manually operable camera release
(B) a sound recording means for recording sound signals on the film, said recording means including;
(B-1) a recording head member provided within the chamber at a fixed position for sound recording,
(B-2) a pressure pad member for operatively engaging the film with the head member for sound recording, said pad member being operatively associated with said camera release and shiftable in response to a camera release operation of the release between a first position in which the pad member disengages the film from the head member and a second position in which the pad member operatively engages the film with the head member for sound recording,
(B-3) a driving shaft member provided within the chamber at a fixed position for continuously advancing the film, and
(B-4) a pressure roller member for operatively engaging the film with the driving shaft member for continuously advancing, said roller member being operatively associated with said camera release means and shiftable between a first position in which the roller member disengages the film from the driving shaft member and a second position in which the roller member operatively engages the film with the driving shaft member for continuously advancing,
(C) a manually operable locking means for locking the pressure pad member and the pressure rolling member at their respective second positions, said locking means being changeable between an unlocking position and a locking position by manual operation from outside of the camera, and
(D) a preventive means for preventing the retracting of the sound film cartridge from the cartridge loading chamber when the pressure pad member and the pressure roller member are locked in the respective second positions by means of the locking means, said preventive means being operatively engaged with the locking means so as to enable the retracting of the cartridge when the locking means is shifted into its unlocking position.

22. A sound motion picture camera according to claim 21, wherein the preventive means for preventing the retracting of the cartridge is constituted as preventive member for preventing the sound film cartridge, advancing into the cartridge loading chamber in functional engagement with the locking means when the pressure pad member and the pressure roller member are locked in their respective 2nd positions by means of the locking means.

23. A sound motion picture camera according to claim 21, further comprising;
a cover means for closing the cartridge loading chamber;
whereby the preventive means for preventing the retracting of the cartridge is constituted as preventive member for preventing the retracting of the sound film cartridge, prohibiting the opening of the cover means in functional engagement of the locking means when the pressure pad member and the pressure roller member are locked in their respective 2nd positions by means of the locking means.

24. A sound motion picture camera according to claim 24, further comprising;
a manually operable cover locking member for locking the cover means at a closed position;
whereby the preventive member can work upon the cover locking member so as to prohibit the releasing of the cover locking member in order to prevent the retracting of the sound film cartridge when the pressure pad member and the pressure roller member are locked in their respective 2nd positions by means of the locking means.

25. A sound motion picture camera capable of simultaneous sound recording with use of a sound film cartridge containing a sound film, comprising;
(A) a cartridge loading chamber for loading the sound film cartridge,
(B) a camera release means movable between a freed position and an operated position for camera releasing by manual operation from outside of the camera,
(C) a sound recording means for recording sound signals on the sound film, said sound recording means including;
(C-1) a recording head member provided within the chamber at a fixed position for sound recording,
(C-2) a pressure pad member for operatively engaging the film with the head member for sound recording, said pad member being operatively associated with the camera release means and shiftable in response to the operation of the release means between a 1st position in which the pad member disengages the film from the head member and a 2nd position in which the pad member operatively engages the film with the head member for sound recording, (C-3) a driving shaft member provided within the chamber at a fixed position for continuously advancing the film, and (C-4) a pressure roller member for operatively engaging the film with the driving shaft member for continuously advancing, said roller member being operatively associated with the camera release means and shiftable in response to the operation of the release means between a 1st position in which the roller member disengages the film from the driving shaft member and a 2nd position in which the roller member operatively engages the film with the driving shaft member for continuously advancing, (D) a manually operable locking means for locking the camera release means at the operated position, said locking means being changeable between an unlocking position and a locking position by manual operation from outside of the camera, and (E) a preventive means for preventing the retracting of the sound film cartridge from the cartridge loading chamber when the camera release means is locked in the operated position by means of the locking means, said preventive means being operatively associated with the locking means so as to enable the retracting of the film cartridge when the locking means is shifted into its unlocking position.

26. A sound motion picture camera according to claim 25, wherein the preventive means for preventing the retracting of the cartridge is constituted as preventive member for preventing the retracting of the sound film cartridge, advancing into the cartridge loading chamber in functional engagement of locking means when the camera locking means is locked in the operated position by means of the locking means.

27. A sound motion picture camera according to claim 25, further comprising;
a cover means for closing the cartridge loading chamber; whereby the preventive means for preventing the retracting of the cartridge is constituted as preventive member for preventing the retracting of the sound film cartridge, prohibiting the opening of the cover means in functional engagement with the locking means when the camera release means is locked in the operated position by means of the locking means.

28. A sound motion picture camera according to claim 27, further comprising;
a manually operable cover locking member for locking the cover means at a closed position;
whereby the preventive means can work upon the cover locking member so as to prevent the retracting of the sound film cartridge, prohibiting the release of the cover locking member when the camera release means is locked in the operated position by means of the locking means.

* * * * *